US012623890B2

(12) United States Patent
Goto

(10) Patent No.: US 12,623,890 B2
(45) Date of Patent: May 12, 2026

(54) LOADING TYPE TRUCK CRANE

(71) Applicant: TADANO LTD., Kagawa (JP)

(72) Inventor: Tomokazu Goto, Kagawa (JP)

(73) Assignee: TADANO LTD., Kagawa (JP)

( * ) Notice: Subject to any disclaimer, the term of this patent is extended or adjusted under 35 U.S.C. 154(b) by 176 days.

(21) Appl. No.: 18/682,214

(22) PCT Filed: Aug. 18, 2022

(86) PCT No.: PCT/JP2022/031275
§ 371 (c)(1),
(2) Date: Feb. 8, 2024

(87) PCT Pub. No.: WO2023/022205
PCT Pub. Date: Feb. 23, 2023

(65) Prior Publication Data
US 2024/0359954 A1 Oct. 31, 2024

(30) Foreign Application Priority Data

Aug. 19, 2021 (JP) ................................. 2021-133758

(51) Int. Cl.
*B66C 23/90* (2006.01)
*B60K 35/22* (2024.01)
(Continued)

(52) U.S. Cl.
CPC ............ *B66C 23/905* (2013.01); *B60K 35/22* (2024.01); *B60K 35/28* (2024.01); *B60P 1/5433* (2013.01);
(Continued)

(58) Field of Classification Search
CPC ....... B66C 23/905; B66C 13/18; B66C 23/36; B66C 23/78; B66C 13/46; B66C 23/54;
(Continued)

(56) References Cited

U.S. PATENT DOCUMENTS 6,170,681 B1 * 1/2001 Yoshimatsu .......... B66C 23/905
212/278
2007/0012641 A1 * 1/2007 Hinata .................. B66C 23/905
212/277

(Continued)

FOREIGN PATENT DOCUMENTS

JP 2008105817 A * 5/2008
JP 2011-037565 A 2/2011

OTHER PUBLICATIONS

Machine Translation: JP-2008105817-A (Year: 2008).*
(Continued)

*Primary Examiner* — Anne Marie Antonucci
*Assistant Examiner* — Connor L Knight
(74) *Attorney, Agent, or Firm* — Paratus Law Group, PLLC

(57) ABSTRACT
There is provided a loading type truck crane that includes an outrigger device including a right outrigger and a left outrigger that are mounted on a vehicle and are capable of extending and retracting in a vehicle width direction of the vehicle, and a crane device that includes a turnable boom and is mounted on the vehicle. A control device that is provided in the truck crane calculates a critical working radius of the crane device on a basis of a ground-contact reaction force of the outrigger device, and implements safety control related to at least one of a lowering operation and an extension operation of the boom by the crane device on a basis of the calculated critical working radius.

6 Claims, 9 Drawing Sheets

(51) Int. Cl.

| | |
|---|---|
| *B60K 35/28* | (2024.01) |
| *B60P 1/54* | (2006.01) |
| *B60S 9/02* | (2006.01) |
| *B66C 13/18* | (2006.01) |
| *B66C 23/36* | (2006.01) |
| *B66C 23/78* | (2006.01) |

(52) U.S. Cl.
CPC ............... *B60S 9/02* (2013.01); *B66C 13/18* (2013.01); *B66C 23/36* (2013.01); *B66C 23/78* (2013.01); *B60K 2360/168* (2024.01)

(58) Field of Classification Search
CPC ......... B66C 23/80; B66C 23/90; B66C 13/16; B66C 23/44; B60K 35/22; B60K 35/28; B60K 2360/168; B60P 1/5433; B60S 9/02
See application file for complete search history.

(56) References Cited

U.S. PATENT DOCUMENTS

| | | | |
|---|---|---|---|
| 2018/0072542 A1* | 3/2018 | Ishikawa ................. | B66C 23/94 |
| 2019/0062130 A1* | 2/2019 | Benton ................. | B66C 23/905 |
| 2019/0152751 A1* | 5/2019 | Midorikawa ........... | B66C 23/90 |
| 2019/0270434 A1* | 9/2019 | Schoonmaker ....... | G01L 5/0061 |
| 2020/0062555 A1* | 2/2020 | Appling, Jr. ........... | B66C 13/16 |
| 2021/0179396 A1* | 6/2021 | Schoonmaker ....... | B66C 23/905 |

OTHER PUBLICATIONS

Singhose, Control Safety Margins for Telescoping-Boom Mechatronic Lifts, 2020 (Year: 2020).*
Oct. 25, 2022, International Search Report issued for related PCT Application No. PCT/JP2022/031275.
Oct. 25, 2022, International Search Opinion issued for related PCT Application No. PCT/JP2022/031275.

* cited by examiner

LOADING TYPE TRUCK CRANE
C

CRANE DEVICE
20

203b (203a)
203

202

203c

203d

205

206

211

307

VEHICLE
10

102

101

103

200
(200b)

201

100

104

Z

X    Y

LOADING TYPE TRUCK CRANE

CROSS REFERENCE TO PRIOR APPLICATION

This application is a National Stage Patent Application of PCT International Patent Application No. PCT/JP2022/031275 (filed on Aug. 18, 2022) under 35 U.S.C. § 371, which claims priority to Japanese Patent Application No. 2021-133758 (filed on Aug. 19, 2021), which are all hereby incorporated by reference in their entirety.

TECHNICAL FIELD

The present invention relates to a loading type truck crane. More specifically, the present invention relates to a loading type truck crane having an overturning prevention function.

BACKGROUND ART

A loading type truck crane often includes a crane device and an outrigger device between an operator cab and a cargo bed. When performing the crane operation, the user of the loading type truck crane performs the crane operation after lifting the vehicle body by the hydraulic jacks provided at the left and right outer end portions of the outrigger device. That is, the boom of the crane device is swung, expanded, retracted, or raised and lowered to lift the cargo, and the cargo is transported.

Patent Literature 1 discloses an overturning prevention device for preventing an overturning accident of the loading type truck crane. In the overturning prevention device, according to the magnitude of the reaction force value of the reaction force detector attached to the outrigger, the amount of movement of the spool of the control valve is reduced when the reaction force value is small, as compared with when the reaction force value is large, and the crane speed is decelerated steplessly. Patent Literature 1 describes that with this configuration, the crane can be decelerated or stopped according to the reaction force value without depending on the operation by the user of the loading type truck crane, and the overturning of the loading type truck crane can be reliably prevented.

CITATION LIST

Patent Literature

Patent Literature 1: JP 2011-37565 A

SUMMARY OF THE INVENTION

Problems to be Solved by the Invention

Since the crane device of the loading type truck crane can perform operations such as turning, expansion and retraction, and derricking of the boom, there are a wide variety of postures that the boom can take. For example, when the posture of the boom with respect to derricking is relatively close to horizontal, when the boom is extended, the reaction force value of the outrigger located on the opposite side of the boom rapidly decreases. On the other hand, when the posture of the boom with respect to the derricking is relatively close to the vertical, the decrease in the reaction force value of the outrigger is moderate even if the boom is extended. In the invention of Patent Literature 1, the crane speed is reduced in a predetermined state to prevent the overturning of the loading type truck crane. However, since the degree of decrease in the reaction force value varies depending on the posture of the boom, when the operation of the boom is decelerated on the safe side, the operation of the boom is rapidly regulated against the operation by the user. As a result, there is a problem that efficiency of crane operation is unnecessarily deteriorated.

In view of the above circumstances, an object of the present invention is to provide a loading type truck crane capable of suppressing overturning of the loading type truck crane without impairing efficiency of crane operation.

Solutions to Problems

An aspect of a loading type truck crane of the present invention includes an outrigger device including a right outrigger and a left outrigger that are mounted on a vehicle and are capable of extending and retracting in a vehicle width direction of the vehicle, a crane device that includes a turnable boom and is mounted on the vehicle, and a control device that calculates a critical working radius of the crane device on a basis of a ground-contact reaction force of the outrigger device, and implements safety control related to at least one of a lowering operation and an extension operation of the boom by the crane device on a basis of the calculated critical working radius.

Effects of the Invention

According to the present invention, it is possible to provide a loading type truck crane capable of suppressing overturning of the loading type truck crane without impairing efficiency of crane operation.

DESCRIPTION OF EMBODIMENTS

Figure 1:
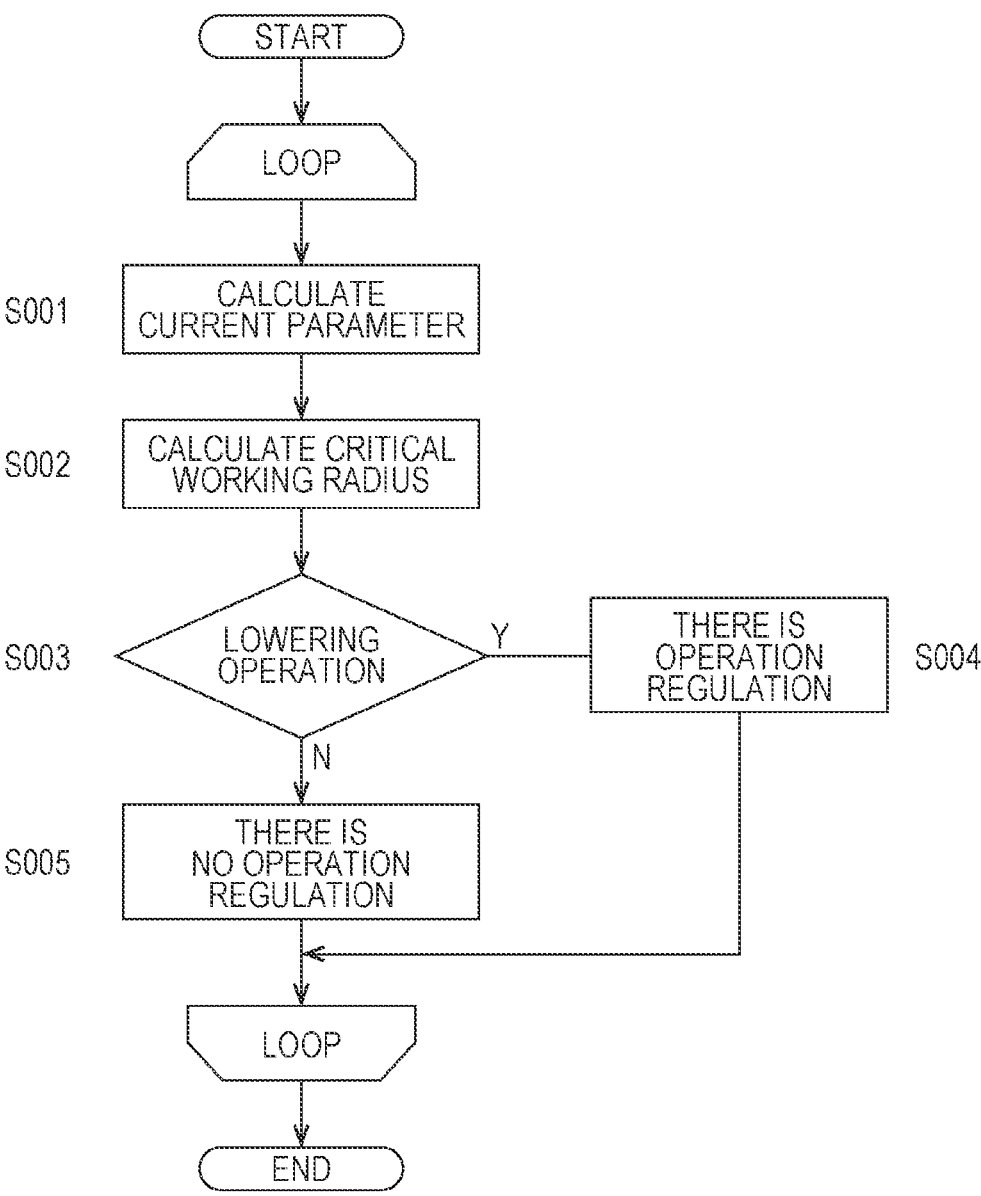
FIG. 1 is a control flowchart based on a critical working radius of a loading type truck crane according to the first embodiment of the present invention.

Next, an embodiment of the present invention will be described with reference to the drawings. However, the embodiment described below exemplifies a loading type truck crane for embodying the technical idea of the present invention, and the loading type truck crane according to the present invention is not limited to the following. Note that the sizes, positional relationships, and the like of the members illustrated in the drawings may be exaggerated for clarity of description.

Figure 2:
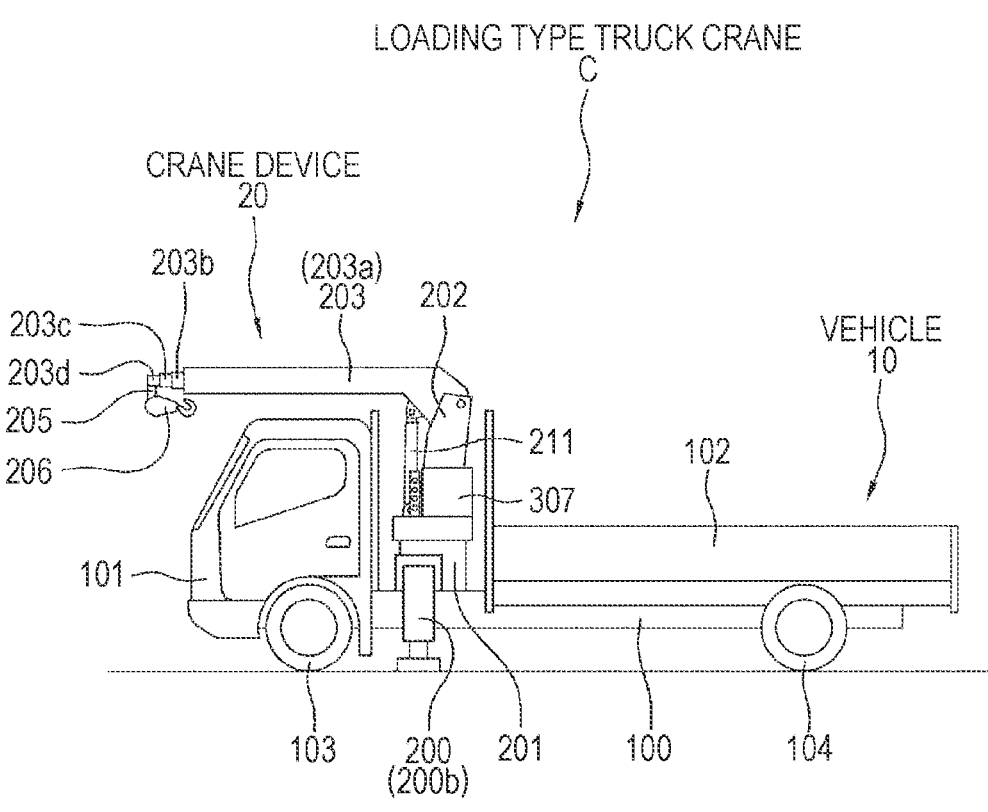
FIG. 2 is a side view of the loading type truck crane.
Figure 2:
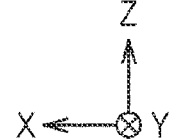

In addition, in the present specification, unless otherwise specified, front, rear, left, and right are described as front, rear, left, and right with respect to a user in a state where the user of the loading type truck crane rides on an operator cab of a vehicle body, and XYZ coordinates are defined as shown in FIG. 2. That is, the front-rear direction is the X coordinate, the left-right direction is the Y coordinate, the vertical direction is the Z coordinate, and the direction of the arrow (direction toward the right in the left-right direction) is the positive direction.

First Embodiment (Loading Type Truck Crane C)

FIG. 2 is a side view of a loading type truck crane C according to the first embodiment of the present invention. As illustrated in FIG. 2, in the loading type truck crane C, a crane device 20 is mounted on a frame 100 of a vehicle 10 between an operator cab 101 and a cargo bed 102 of the general-purpose truck vehicle 10. The vehicle 10 is provided with front wheels 103 symmetrically in the left-right direction. Furthermore, the vehicle 10 is provided with rear wheels 104 symmetrically in the left-right direction.

As illustrated in FIG. 2, the crane device 20 includes a fixing portion 201 fixed on the frame 100, a turning table 202 turnably provided on the fixing portion 201, and a boom 203 derrickably provided on an upper end portion of the turning table 202. In addition, the loading type truck crane C includes an outrigger device 200. The outrigger device 200 is provided in the fixing portion 201 and extends outward from the fixing portion 201 in the left-right direction. That is, the crane device 20 and the outrigger device 200 are provided between the operator cab 101 and the cargo bed 102 when viewed from the side direction. The outrigger device 200 includes a right outrigger and a left outrigger. The right outrigger includes a right jack 200a provided at the right end portion. The left outrigger includes a left jack 200b provided at the left end portion.

The turning table 202 is provided with a winch (not illustrated). A wire rope 205 is wound around the winch. The wire rope 205 is suspended from the distal end portion of the boom 203 by a pulley provided at the distal end portion of the boom 203. A hook 206 is fixed to a distal end portion of the wire rope 205. The boom 203 includes a proximal end boom 203a, a first intermediate boom 203b, a second intermediate boom 203c, and a distal end boom 203d with them configured by nesting. The boom 203 expands and retracts on the basis of power of a boom expansion/retraction actuator 210a (see FIG. 3) to be described later.

Figure 3:
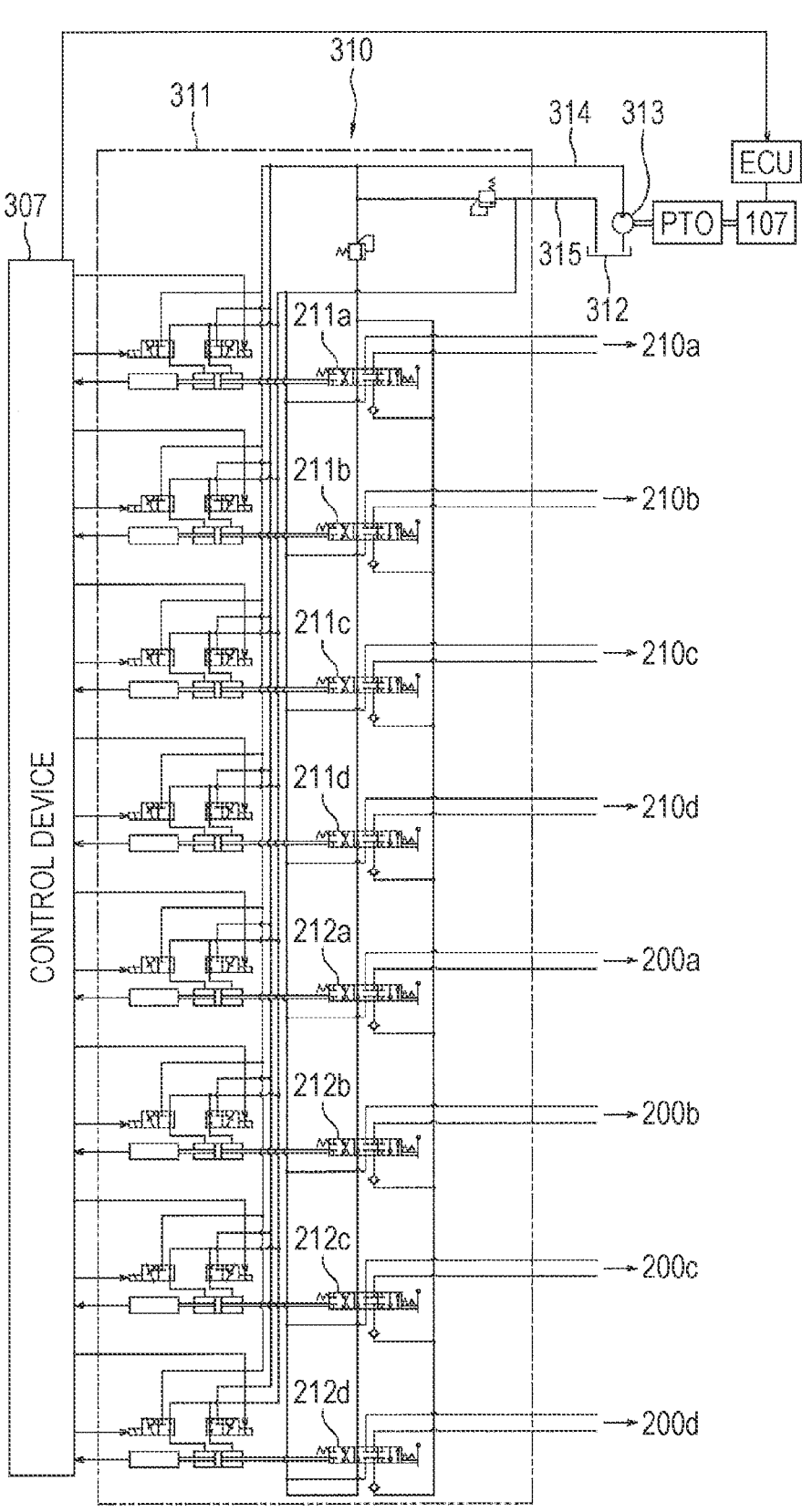
FIG. 3 is a hydraulic circuit diagram of the loading type truck crane.

The crane device 20 is hydraulically driven by a hydraulic circuit 310 (see FIG. 3). A lever group for operating the hydraulic circuit 310 is provided on both left and right sides of the fixing portion 201. In addition, a control device 307 that electrically controls the hydraulic circuit 310 and controls the work vehicle is provided in the fixing portion 201.

(Hydraulic Circuit 310)

FIG. 3 is a hydraulic circuit diagram of the loading type truck crane C according to the present embodiment. The hydraulic circuit 310 of the crane device 20 includes a hydraulic valve unit 311, a hydraulic pump 313, a main oil passage 314, a return oil passage 315, crane device actuators 210a to 210d, a right jack 200a, a left jack 200b, a right overhanging actuator 200c, and a left overhanging actuator 200d.

The hydraulic pump 313 supplies the hydraulic oil in a tank 312 to the hydraulic valve unit 311. The main oil passage 314 connects the hydraulic pump 313 and the hydraulic valve unit 311. The return oil passage 315 connects the hydraulic valve unit 311 and the tank 312. Each of the crane device actuators 210a to 210d is an actuator for performing a derricking operation of the boom 203, a telescopic operation of the boom 203, a turning operation of the boom 203, a winding-up and winding-down operation of the winch, and the like.

The crane device actuators 210a to 210d, the right jack 200a, the left jack 200b, the right overhanging actuator 200c, and the left overhanging actuator 200d are connected to the hydraulic valve unit 311.

The hydraulic pump 313 is connected to an engine 107 of a general-purpose truck via a power take-off (PTO) device. The hydraulic pump 313 is driven by the engine 107.

The hydraulic valve unit 311 includes a boom expansion/retraction control valve 211a, a winch control valve 211b, a boom derricking control valve 211c, a boom turning control valve 211d, a right jack control valve 212a, a left jack control valve 212b, a right overhanging control valve 212c, and a left overhanging control valve 212d.

The boom expansion/retraction control valve 211a is connected to the boom expansion/retraction actuator 210a. The winch control valve 211b is connected to the winch hydraulic motor 210b. The boom derricking control valve 211c is connected to the boom derricking actuator 210c. The boom turning control valve 211d is connected to the boom turning actuator 210d.

The right jack control valve 212a is connected to the right jack 200a located on the right side. The left jack control valve 212b is connected to the left jack 200b located on the left side.

The right overhanging control valve 212c is connected to the right overhanging actuator 200c. The left overhanging control valve 212d is connected to the left overhanging actuator 200d.

A lever (not illustrated) is connected to each of these switching control valves. The direction and the flow rate of the hydraulic oil supplied from the hydraulic pump 313 are switched by the operator manually operating these levers.

The control device 307 is also connected to an engine control unit (ECU) of the engine 107. The control device 307 is configured to be able to control at least the rotation speed of the engine 107. The control device 307 adjusts the discharge amount of the hydraulic pump 313 by controlling the rotation speed of the hydraulic pump 313 by controlling the rotation speed of the engine 107.

(Control Circuit)

Figure 4:
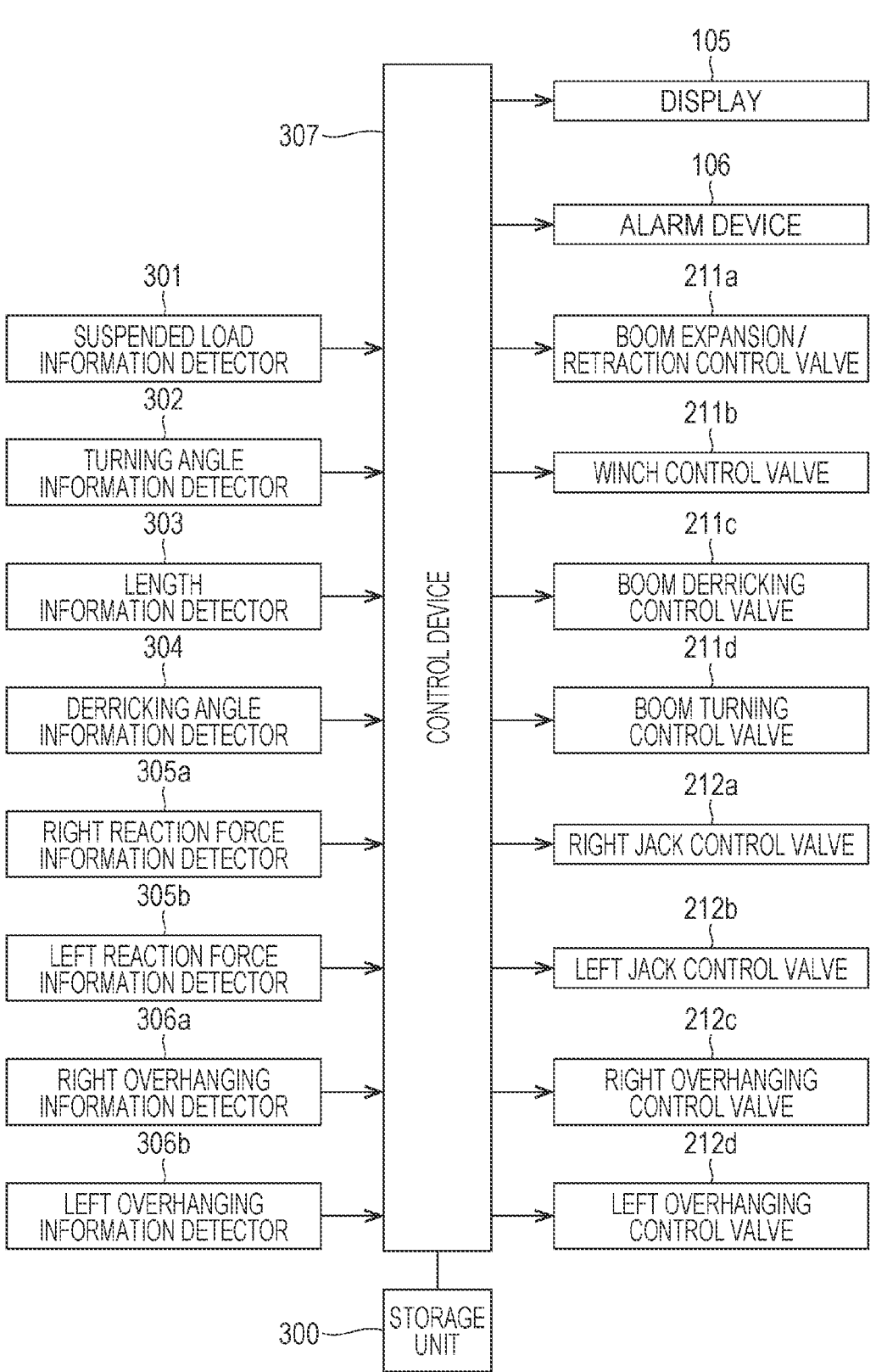
FIG. 4 is a control circuit diagram of the loading type truck crane.

FIG. 4 is a control circuit diagram of the loading type truck crane C according to the present embodiment. A storage unit 300 is connected to the control device 307.

A suspended load information detector 301, a turning angle information detector 302, a length information detector 303, a derricking angle information detector 304, a right reaction force information detector 305a, a left reaction force information detector 305b, a right overhanging information detector 306a, and a left overhanging information detector 306b are connected to the input side of the control device 307.

A display 105, an alarm device 106, the boom expansion/retraction control valve 211a, the winch control valve 211b, the boom derricking control valve 211c, the boom turning control valve 211d, the right jack control valve 212a, the left jack control valve 212b, the right overhanging control valve 212$c$, and the left overhanging control valve 212$d$ are connected to the output side of the control device 307.

The suspended load information detector 301 detects the load hung on the hook 206. In the present embodiment, the suspended load information detector 301 includes a differential pressure gauge provided in the boom derricking actuator 210$c$.

The differential pressure detected by the suspended load information detector 301 is output to the control device 307. Note that the detection method of the suspended load information detector 301 may be another method. For example, the suspended load information detector 301 may include a load cell in a sheave provided at the distal end of the boom 203, or may include a strain gauge that detects strain of the boom expansion/retraction actuator 210$a$.

The turning angle information detector 302 is for detecting the turning angle of the boom 203, and is disposed on the root of the turning table 202. For example, the turning angle information detector 302 is a potentiometer. The turning angle information detector 302 may include a rotary encoder.

The length information detector 303 detects the length of the boom 203. The length information detector 303 is, for example, a code wound-out length detector. The code wound-out length detector detects a feed-out length of the length measuring cord by detecting a rotational displacement amount of the cord winder.

The derricking angle information detector 304 detects a derricking angle $\theta$b of the boom 203. The derricking angle information detector 304 is disposed on the root of the boom 203. For example, the derricking angle information detector 304 is a potentiometer. The derricking angle information detector 304 may include a rotary encoder.

The right reaction force information detector 305$a$ detects a reaction force (ground-contact reaction force) acting on the right jack 200$a$ provided at the right outer end portion of the outrigger device 200. The right reaction force information detector 305$a$ is, for example, a load cell including a strain gauge or a pressure gauge capable of detecting the pressure in the jack. However, the configuration of the right reaction force information detector 305$a$ is not limited to this configuration.

The left reaction force information detector 305$b$ detects a reaction force (ground-contact reaction force) acting on the left jack 200$b$ provided at the left outer end of the outrigger device 200. The left reaction force information detector 305$b$ is, for example, a load cell using a strain gauge or a pressure gauge capable of detecting the pressure in the jack. However, the left reaction force information detector 305$b$ is not limited to the load cell and the pressure gauge.

The right overhanging information detector 306$a$ detects that the right jack 200$a$ of the outrigger device 200 is at a predetermined overhanging position. The right overhanging information detector 306$a$ is, for example, a proximity switch. However, the right overhanging information detector 306$a$ is not limited to the proximity switch. Also, the right overhanging information detector 306$a$ may be configured by, for example, a code wound-out length detector.

The left overhanging information detector 306$b$ detects that the left jack 200$b$ of the outrigger device 200 is at a predetermined overhanging position. The left overhanging information detector 306$b$ is, for example, a proximity switch. However, the left overhanging information detector 306$b$ is not limited to the proximity switch. Also, the left overhanging information detector 306$b$ may be configured by, for example, a code wound-out length detector.

The display 105 displays, for example, a suspended load.

When the state is a predetermined state, for example, when the load is a suspended load exceeding the rated load, the alarm device 106 notifies the user of the loading type truck crane C of the state. In the present embodiment, the alarm device 106 is provided outside the operator cab 101. (Control Flow Based on Critical Working Radius Radi')

Figure 5:
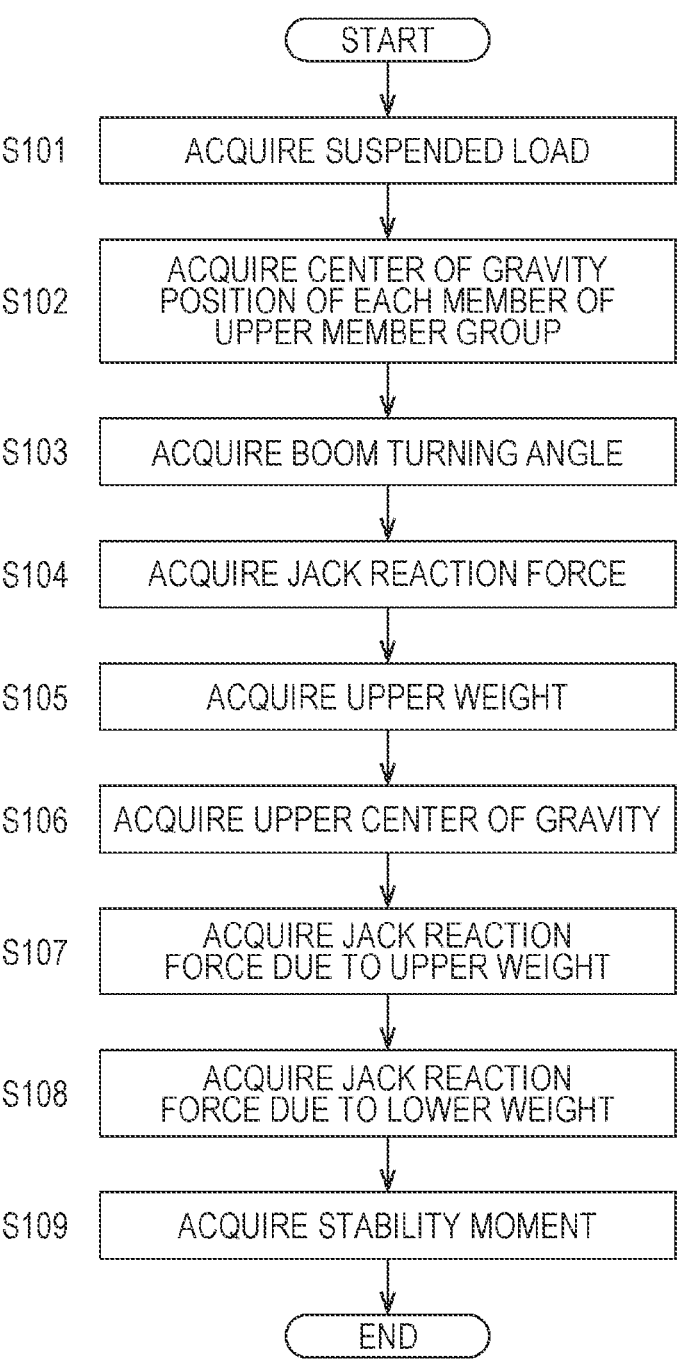
FIG. 5 is a flow diagram of acquisition of a current parameter before calculation of a critical working radius of the loading type truck crane.

FIG. 1 is a control flowchart based on a critical working radius Radi' of the loading type truck crane C according to the first embodiment of the present invention. FIG. 5 is a flowchart of acquisition of the current parameter before the critical working radius Radi' is calculated.

The control flow of FIG. 1 and the acquisition flow of FIG. 5 are executed at a predetermined cycle. Here, the critical working radius Radi' is a standard for regulating at least one of the lowering operation and the extension operation which are the operations of the crane device 20 according to the weight of the suspended load currently hung, the weight of the cargo on the cargo bed 102, and the like.

In the present embodiment, the critical working radius Radi' is a radius at which it is determined that the boom derricking angle $\theta$b cannot be further decreased or a radius at which it is determined that a boom length Lb cannot be further extended. That is, the critical working radius Radi' defines the limit of the operation of the boom that increases the working radius. However, the critical working radius Radi' is not limited to the definition in the present embodiment, and may be a standard for regulating the operation of the crane device 20.

As illustrated in FIG. 1, in step S001 (hereinafter, it is written as "S001"), the control device 307 acquires a current parameter necessary for calculating the critical working radius Radi'.

The acquisition of the current parameter is preferably performed, for example, on the basis of the acquisition flow illustrated in FIG. 5. Before the acquisition flow of FIG. 5 is performed, that is, at the time of shipment of the loading type truck crane C, information about the loading type truck crane C necessary for acquiring the above parameters is stored in the storage unit 300. An example of the stored information will be described with reference to FIG. 8.

Figure 8:
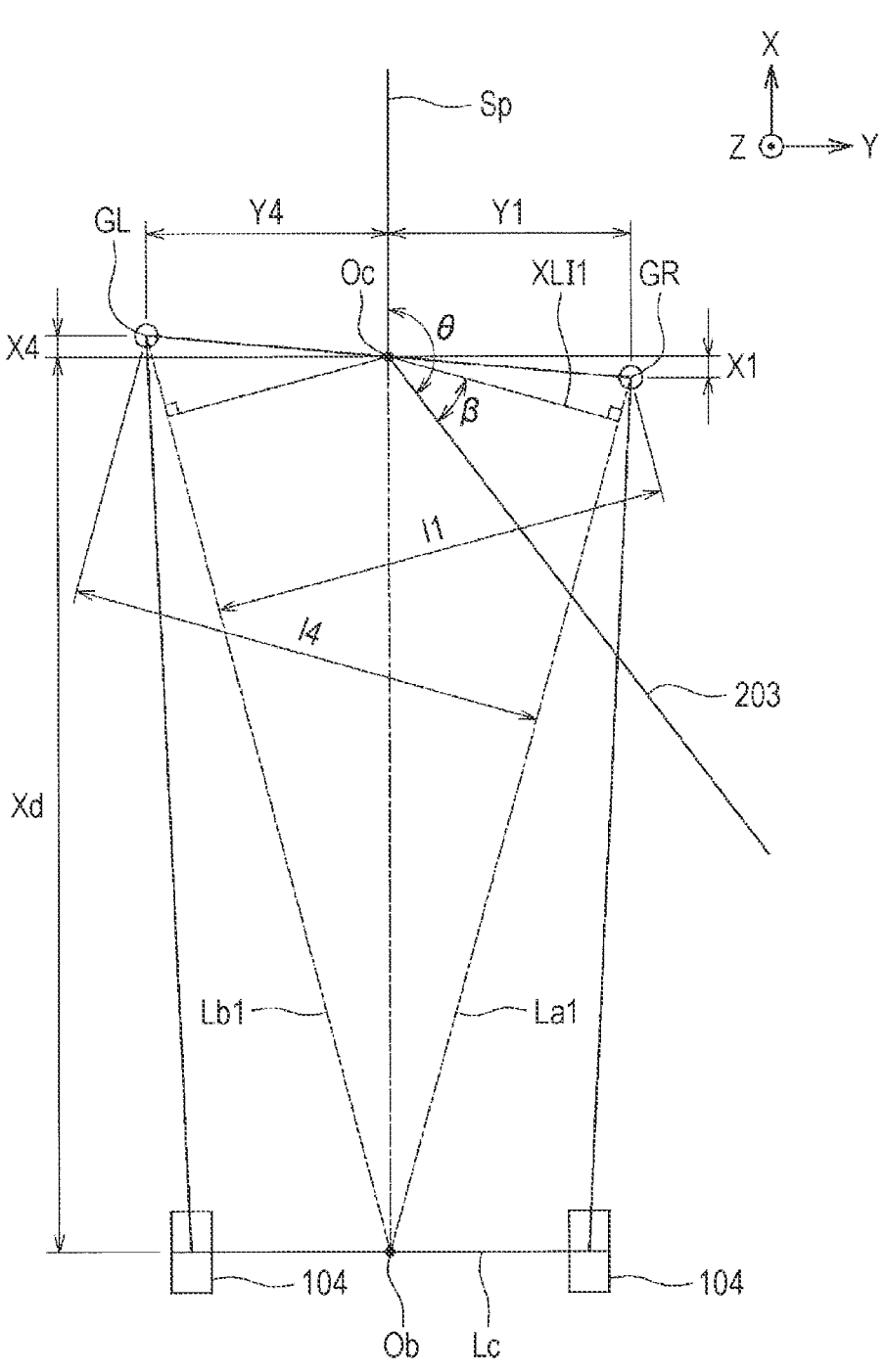
FIG. 8 is a schematic plan view of the loading type truck crane.

FIG. 8 is a schematic plan view of the loading type truck crane C of FIG. 1. In this schematic diagram, as indicated by the coordinate axes in FIG. 8, the operator cab 101 is positioned on the upper side of the paper surface, and the cargo bed 102 is positioned on the lower side of the paper surface.

FIG. 8 illustrates a state in which the outrigger device 200 overhangs most to the left and right. The right jack 200$a$ is grounded at a ground contact position GR. The left jack 200$b$ is grounded at a ground contact position GL.

The left and right center axis of the loading type truck crane C is set as a reference position Sp. FIG. 8 illustrates a state in which the boom 203 has turned about a turning center Oc by a boom turning angle $\theta$ from the reference position Sp.

For example, the storage unit 300 stores a strength rated load Wstr for each working radius Radi of the boom 203.

For example, the storage unit 300 stores a distance Xd in the front-rear direction between the turning center Oc of the crane device 20 and the pair of rear wheels 104.

For example, the storage unit 300 stores a right overturning line La1 and a left overturning line Lb1. The right overturning line La1 and the left overturning line Lb1 are indicated by alternate long and short dash lines in FIG. 8. The right overturning line La1 and the left overturning line Lb1 calculated by the control device 307 are stored.

For example, the right overturning line La1 is defined as a horizontal line connecting the ground contact position GR of the right jack 200*a* and a center position Ob of a rear wheel line Lc in the vehicle width direction. The left overturning line Lb1 is defined as a horizontal line connecting the ground contact position GL of the left jack 200*b* and the center position Ob of the rear wheel line Lc in the vehicle width direction.

As another method, the right overturning line La1 and the left overturning line Lb1 can also be defined as lines connecting, for example, the ground contact position GR or the ground contact position GL and any other point on the rear wheel line Lc.

For example, the storage unit 300 stores the position and the length of the rear wheel line Lc. The rear wheel line Lc is a straight line that passes through the center positions of the pair of rear wheels 104 and is parallel to the vehicle width direction when the loading type truck crane C is viewed from above the vehicle. The rear wheel line Lc exists between the pair of rear wheels 104 in the vehicle width direction.

For example, the storage unit 300 stores a factor of safety N which is a ratio between a chipping load Wtip of the loading type truck crane C and a rated total load Wrate. The chipping load Wtip is a lifting load at a limit at which the loading type truck crane C overturns. The relationship between the chipping load Wtip, the rated total load Wrate, and the factor of safety N is expressed by the following Expression 1. Here, the factor of safety N is one or more constants determined by the specifications of the loading type truck crane C.

[Mathematical Expression 1]

$$Wtip = N \times Wrate \qquad \text{Expression (1)}$$

For example, the storage unit 300 stores a distance X1 between the turning center Oc and the ground contact position GR in the front-rear direction, and a distance X4 between the turning center Oc and the ground contact position GL in the front-rear direction.

For example, the storage unit 300 stores a distance Y1 between the turning center Oc and the ground contact position GR in the vehicle width direction, and a distance Y4 between the turning center Oc and the ground contact position GL in the vehicle width direction. For example, the storage unit 300 stores a distance l4 between the ground contact position GL and the right overturning line La1 and a distance l1 between the ground contact position GR and the left overturning line Lb1.

Next, a flow of acquisition of parameters necessary for calculating the critical working radius Radi' will be described with reference to FIG. 5.

As illustrated in FIG. 5, the control device 307 acquires a suspended load Tload in S101. The suspended load Tload is calculated and acquired by the control device 307 on the basis of information from the suspended load information detector 301.

In S102, the control device 307 acquires the gravity center position of each member constituting the upper member group in the loading type truck crane C. The upper member group includes the turning table 202, the boom derricking actuator 210*c*, and the boom 203. The upper member group may include a member fixed to the turning table 202, the boom derricking actuator 210*c*, or the boom 203. The gravity center position of each member constituting the upper member group may be acquired from the storage unit 300.

In S103, the control device 307 acquires the boom turning angle θ. The control device 307 acquires the boom turning angle θ from the information from the turning angle information detector 302.

At this time, the control device 307 determines the opposite overturning side jack on the basis of the acquired boom turning angle θ. The opposite overturning side jack is one jack of the right jack 200*a* and the left jack 200*b*, the one jack being present opposite to the boom 203 in the vehicle width direction with the center axis in the vehicle width direction of the loading type truck crane C as a reference. The center axis in the vehicle width direction means an axis that passes through the center in the vehicle width direction of the loading type truck crane C and is parallel to the front-rear direction.

Specifically, when determining that the boom 203 is turning right of the vehicle on the basis of the detection value of the turning angle information detector 302, the control device 307 sets the left jack 200*b* as the opposite overturning side jack. On the other hand, when determining that the boom 203 is turning left of the vehicle on the basis of the detection value of the turning angle information detector 302, the control device 307 sets the right jack 200*a* as the opposite overturning side jack.

Further, the control device 307 determines the overturning reference line at that time on the basis of the detection value of the turning angle information detector 302. The overturning reference line is a line existing in a direction same as that of the boom 203 in the vehicle width direction of the right overturning line La1 or the left overturning line Lb1.

Specifically, when determining that the boom 203 is turning right of the vehicle on the basis of the detection value of the turning angle information detector 302, the control device 307 sets the right overturning line La1 as the overturning reference line. On the other hand, when determining that the boom 203 is turning left of the vehicle on the basis of the detection value of the turning angle information detector 302, the control device 307 sets the left overturning line Lb1 as the overturning reference line.

In S104, the control device 307 acquires the jack reaction force. Specifically, the control device 307 acquires a right jack reaction force PF1 of the right jack 200*a* on the basis of the reaction force information from the right reaction force information detector 305*a*. In addition, the control device 307 acquires a left jack reaction force PF4 of the left jack 200*b* on the basis of the reaction force information from the left reaction force information detector 305*b*.

In S105, the control device 307 acquires the combined weight (hereinafter, referred to as an "upper weight Uwei") of the upper member group and the suspended load. The upper weight Uwei is preferably determined by the following Expression 2.

[Mathematical Expression 2]

$$Uwei = Tload + Wbm + Wecy + Wsle \qquad \overline{\text{Expression (2)}}$$

Figure 7:
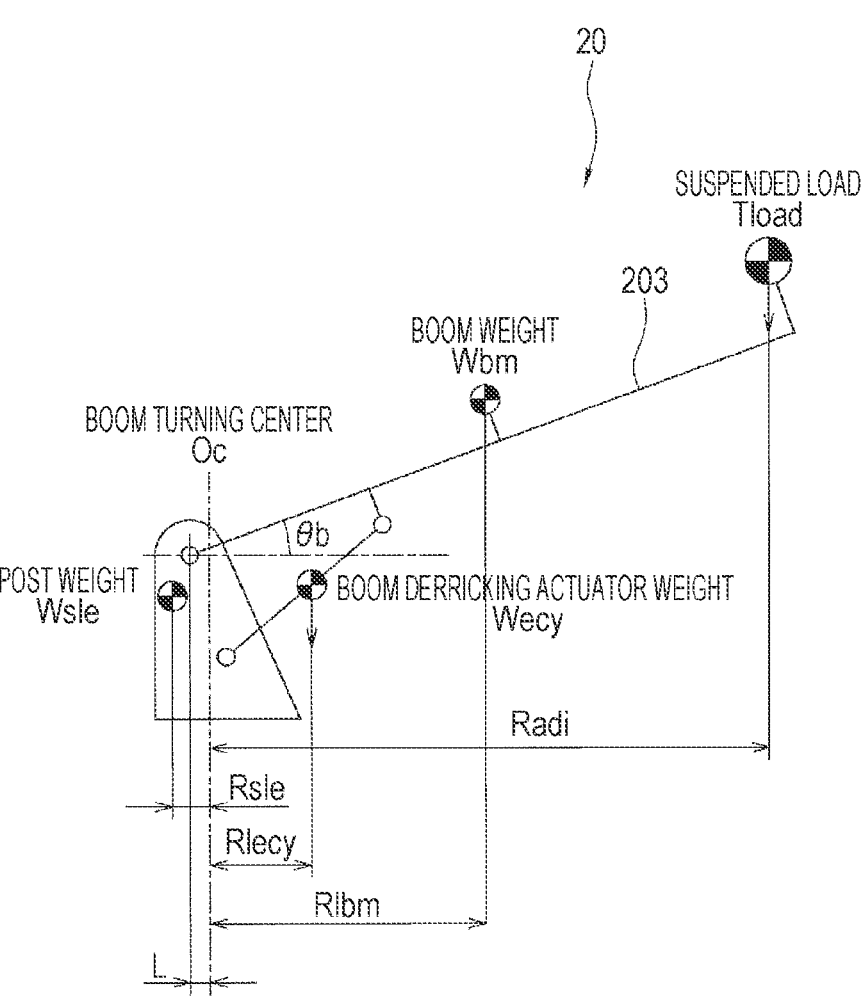
FIG. 7 is a schematic diagram when a boom of the loading type truck crane has a predetermined derricking angle.

FIG. 7 is a schematic diagram when the boom 203 of the loading type truck crane C has a predetermined derricking angle, that is, a boom derricking angle θb. The parameters in Expression 2 are defined as follows. These parameters may be acquired from the storage unit 300. These parameters are also shown in FIG. 7.

Uwei: An upper weight

Tlaod: A suspended load

Wbm: A weight of the boom 203

Wecy: A weight of the boom derricking actuator 210c

Wsle: A weight of the turning table 202

In S106, the control device 307 acquires a center of gravity (hereinafter, referred to as "upper center of gravity Ugra") of the upper member group and the suspended load combined. More specifically, the upper center of gravity Ugra refers to a horizontal distance from the turning center Oc of the boom 203 to the center of gravity of a combination of the upper member group and the suspended load. The upper center of gravity Ugra is preferably obtained by the following Expression 3.

[Mathematical Expression 3]

$$Ugra = (Tload \times Radi + \qquad\qquad\qquad \text{Expression (3)}$$
$$Wbm \times Rlmb + Wecy \times Rlecy + Wsle \times Rlsle)/Uwei$$

The parameters in Expression 3 are defined as follows. These parameters may be acquired from the storage unit 300. These parameters are also shown in FIG. 7.

Ugra: An upper center of gravity

Radi: A working radius

Rlbm: A horizontal distance between the turning center Oc and the center of gravity of the boom 203.

Rlecy: A horizontal distance between turning center Oc and the center of gravity of the boom derricking actuator 210c

Rlsle: A horizontal distance between the turning center Oc and the center of gravity of the turning table 202

The working radius Radi is preferably defined by the following Expression 4.

[Mathematical Expression 4]

$$Radi = Lb \times \cos\theta b - Lbh \times \sin\theta b - L \qquad \text{Expression (4)}$$

The parameters in Expression 4 are defined as follows. These parameters may be acquired from the storage unit 300. These parameters are also shown in FIG. 7.

Radi: A working radius

Lb: A length of the boom 203

θb: A boom derricking angle

Lbh: A distance in the vertical direction from the root of the boom 203 to the point of action of the suspended load when the boom 203 is horizontal.

L: A distance between attachment fulcrum of the boom 203 and the turning center Oc of the turning table 202

In S107, the control device 307 calculates and acquires the jack reaction force due to the upper weight Uwei. The jack reaction force includes a jack reaction force PF1u of the right jack 200a and a jack reaction force PF4u of the left jack 200b. Hereinafter, a method of calculating the jack reaction force by the upper weight Uwei will be described.

First, in Expressions 5 to 7 described later, a thrust load (ton) applied to the upper weight Uwei to the turning center Oc is defined as Ft, a moment around the X axis due to the upper weight Uwei is defined as Mx (ton·m), and a moment around the Y axis due to the upper weight Uwei is defined as My (ton·m).

[Mathematical Expression 5]

$$Ft = Uwei \qquad\qquad \text{Expression (5)}$$

[Mathematical Expression 6]

$$Mx = Uwei \times Ugra \times \sin\theta \qquad\qquad \text{Expression (6)}$$

[Mathematical Expression 7]

$$My = Uwei \times Ugra \times \cos\theta \qquad\qquad \text{Expression (7)}$$

In addition, the reaction force coefficient S by these Ft, Mx, and My is defined by the following Expression 8.

[Mathematical Expression 8]

$$S = Y1 \times (Xd - X4) + Y4 \times (X1 - Xd) \qquad \text{Expression (8)}$$

The parameters in Expression 8 are defined as follows, again. These parameters may be acquired from the storage unit 300. These parameters are also shown in FIG. 8.

Xd: A distance between turning center Oc and the pair of rear wheels 104 in the front-rear direction X1: A distance between the turning center Oc and the ground contact position GR in front-rear direction X4: A distance between the turning center Oc and the ground contact position GL in front-rear direction Y1: A distance between the turning center Oc and the ground contact position GR in vehicle width direction Y4: A distance between the turning center Oc and the ground contact position GL in vehicle width direction From Expression 8, F(PF1), Mx(PF1), and My(PF1) are defined by Expressions 9 to 11 below.

[Mathematical Expression 9]

$$F(PF1) = -Xd \times Y4/S \qquad\qquad \text{Expression (9)}$$

[Mathematical Expression 10]

$$Mx(PF1) = (X4 - Xd)/S \qquad\qquad \text{Expression (10)}$$

[Mathematical Expression 11]

$$My(PF1) = Y4/S \qquad\qquad \text{Expression (11)}$$

From Expressions 9 to 11, the jack reaction force PF1u (ton) of the right jack 200a due to the upper weight Uwei is obtained by the following Expression 12.

[Mathematical Expression 12]

$$PF1u = Ft \times F(PF1) + Mx \times Mx(PF1) + My \times My(PF1) = \quad \text{Expression (12)}$$
$$Uwei \times F(PF1) - Uwei \times Ugra \times \sin\theta \times Mx(PF1) -$$
$$Uwei \times Ugra \times \cos\theta \times My(PF1) = Uwei \times (F(PF1) -$$
$$Ugra \times \sin\theta \times Mx(PF1) - Ugra \times \cos\theta \times My(PF1))$$

In addition, from Expression 8, F(PF4), Mx(PF4), and My(PF4) are defined by the following Expressions 13 to 15.

[Mathematical Expression 13]

$$F(PF4) = Xd \times Y1/S \qquad\qquad \text{Expression (13)}$$

[Mathematical Expression 14]

$$Mx(PF4) = (Xd - X1)/S \qquad\qquad \text{Expression (14)}$$

-continued

[Mathematical Expression 15]

$$My(PF4) = -Y1/S \qquad \text{Expression (15)}$$

From Expressions 13 to 15, the jack reaction force PR4u (ton) of the left jack 200*b* due to the upper weight Uwei is obtained from the following Expression 16.

[Mathematical Expression 16]

$$PF4u = Ft \times F(PF4) + Mx \times Mx(PF4) + My \times My(PF4) = \qquad \text{Expression (16)}$$
$$Uwei \times F(PF4) - Uwei \times Ugra \times \sin\theta \times Mx(PF4) -$$
$$Uwei \times Ugra \times \cos\theta \times My(PF4) = Uwei \times (F(PF4) -$$
$$Ugra \times \sin\theta \times Mx(PF4) - Ugra \times \cos\theta \times My(PF4))$$

In S108, the control device 307 calculates and acquires the jack reaction force due to the lower weight of the lower member group. The lower member group includes the vehicle 10, the outrigger device 200, the fixing portion 201, and the cargo on the cargo bed 102. Therefore, the lower weight is the sum of the weights of the vehicle 10, the outrigger device 200, and the fixing portion 201 and the weight of the cargo of the cargo bed 102.

This lower weight is not directly determined because the weight of the cargo is unknown. Therefore, in the present embodiment, the jack reaction force due to the lower weight is acquired by subtracting the jack reaction force due to the upper weight Uwei acquired in S107 from the jack reaction force acquired in S104.

A jack reaction force PF11 of the right jack 200*a* due to the lower weight is calculated and acquired by the following Expression 17.

[Mathematical Expression 17]

$$PF11 = PF1 - PF1u \qquad \text{Expression (17)}$$

A jack reaction force PF41 of the left jack 200*b* due to the lower weight is calculated and acquired by the following Expression 18.

[Mathematical Expression 18]

$$PF41 = PF4 - PF4u \qquad \text{Expression (18)}$$

In S109, the control device 307 calculates and acquires a moment (hereinafter, referred to as a "stability moment") due to the lower weight around the overturning line. Since the overturning line includes two lines of the right overturning line La1 and the left overturning line Lb1, the stability moment is acquired for each of them.

A stability moment SMOMr (ton·m) around the right overturning line La1 is calculated and acquired by the following Expression 19.

[Mathematical Expression 19]

$$SMOMr = PF41 \times 14 \qquad \text{Expression (19)}$$

The parameters in Expression 19 are defined as follows, again. These parameters may be acquired from the storage unit 300. These parameters are also shown in FIG. 8.

14: A distance between the ground contact position GL and the right overturning line La1

A stability moment SMOMl (ton·m) around the left overturning line Lb1 is calculated and acquired by the following Expression 20.

[Mathematical Expression 20]

$$SMOM1 = PF11 \times 11 \qquad \text{Expression (20)}$$

The parameters in Expression 20 are defined as follows, again. These parameters may be acquired from the storage unit 300. These parameters are also shown in FIG. 8.

11: A distance between the ground contact position GR and the left overturning line Lb1

Next, referring back to FIG. 1, in S002, the control device 307 calculates the critical working radius Radi' on the basis of the current parameters. In the present embodiment, a critical working radius Radi'1 for the lowering operation is calculated. In the following description, a case where the boom 203 is positioned on the right side as illustrated in FIG. 8 will be described.

Figure 6:
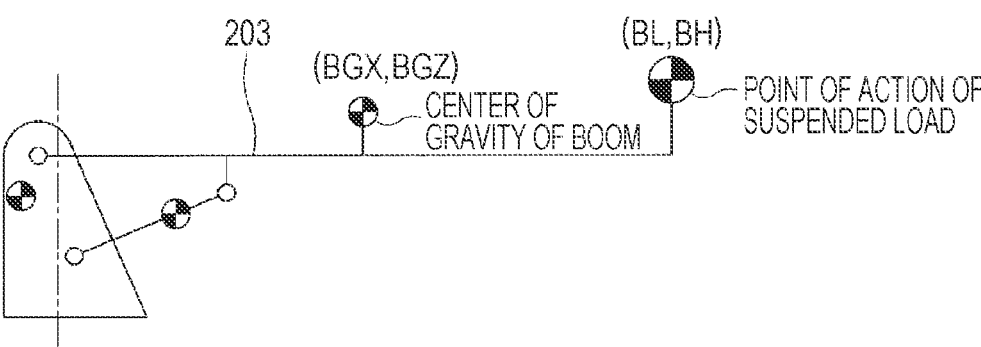
FIG. 6 is a schematic diagram when a boom of the loading type truck crane has a derricking angle of zero.

FIG. 6 is a diagram schematically illustrating a case where the boom 203 has a derricking angle of 0 in the loading type truck crane C according to the present embodiment. As illustrated in FIG. 6, when the critical working radius Radi' is obtained, the coordinates of the point of action of the suspended load Tload and the center of gravity of the boom on which the boom weight acts are determined as follows. Note that these coordinates may be stored in the storage unit 300.

BL: A distance from the root of the boom 203 to the point of action of the suspended load in the left-right direction on the paper surface of FIG. 6, the boom length BH: A distance from the root of the boom 203 to the point of action of the suspended load in the vertical direction on the paper surface of FIG. 6

BGX: A distance from the root of the boom 203 to the center of gravity of the boom in the left-right direction on the paper surface of FIG. 6

BGZ: A distance from the root of the boom 203 to the center of gravity of the boom in the vertical direction on the paper surface of FIG. 6

The current chipping load Wtip' is a value obtained by multiplying the suspended load Tload by the factor of safety N as shown in Expression 21.

[Mathematical Expression 21]

$$Wtip' = Tload \times N \qquad \text{Expression (21)}$$

In addition, when the derricking angle in a case where the critical working radius for the lowering operation is Radi'1 is θb', the following relationship is established with respect to a horizontal distance Rlbm'1 between the turning center Oc and the center of gravity of the boom 203 in a case where the critical working radius for the lowering operation is Radi'1 and the derricking angle is θb'.

[Mathematical Expression 22]

$$Radi' \, 1 = BL \times \cos\theta b' - BH \times \sin\theta b' - L \qquad \text{Expression (22)}$$

-continued

[Mathematical Expression 23]

$$Rlbm'\ 1 = BGX \times \cos\theta b' - BGZ \times \sin\theta b' - L \qquad \text{Expression (23)}$$

In addition, the current upper weight Uwei'1 and the upper center of gravity Ugra'1 are expressed by the following Expression.

[Mathematical Expression 24]

$$Uwei'\ 1 = Wtip' + Wbm + Wecv + Wsle \qquad \text{Expression (24)}$$

[Mathematical Expression 25]

$$Ugra'\ 1 = (Wtip' \times Radi'\ 1 + \qquad\qquad \text{Expression (25)}$$
$$Wbm \times Rlbm'\ 1 + Wecv \times Rlecv + Wsle \times Rlsle)/Uwei'\ 1$$

In the present embodiment, since the critical working radius Radi'1 for the lowering operation is a radius at which it is determined that the boom derricking angle θb cannot be further decreased, when the critical working radius Radi'1 for the lowering operation is satisfied, the moment due to the upper weight at the current state is equal to the stability moment SMOMr at the current state, and the following Expression 26 is established.

[Mathematical Expression 26]

$$Uwei'\ 1 \times (Ugra'\ 1 \times \cos\beta - XLI1) = SMOMr \qquad \text{Expression (26)}$$

The parameters in Expression 26 are defined as follows. These parameters may be acquired from the storage unit 300. These parameters are also shown in FIG. 8.

β: An angle formed by a perpendicular line drawn from the turning center Oc to the right overturning line La1 and the boom 203 at the current state in the horizontal plane XLI1: A distance from the turning center Oc to the right overturning line La1 in the horizontal plane θb' is calculated as the derricking angle at the critical working radius Radi'1 for the lowering operation, the derricking angle satisfying the above Expressions 21 to 26, and the critical working radius Radi'1 for the lowering operation is calculated from this angle.

Next, in S003, the control device 307 determines whether the user of the loading type truck crane C selects the lowering operation. When determining that the lowering operation is selected, the control device 307 advances the process to S004. When determining that the lowering operation is not selected, the control device 307 advances the process to S005.

In S004, the control device 307 implements safety control on the basis of the critical working radius Radi'1. The safety control includes, for example, at least one of control (regulation control) for regulating the lowering operation of the boom 203 and control (notification control) for notifying the user of the loading type truck crane C of information. Specifically, in the safety control, the control device 307 performs speed regulation or disables the lowering operation on the lowering operation of approaching the critical working radius Radi'1. The notification to the user is performed using the alarm device 106 connected to the control device 307, or an alarm is displayed on a display 105 connected to the control device 307.

In S005, the control device 307 ends the operation flow without regulating the operation of the crane device 20.

Second Embodiment

Figure 9:
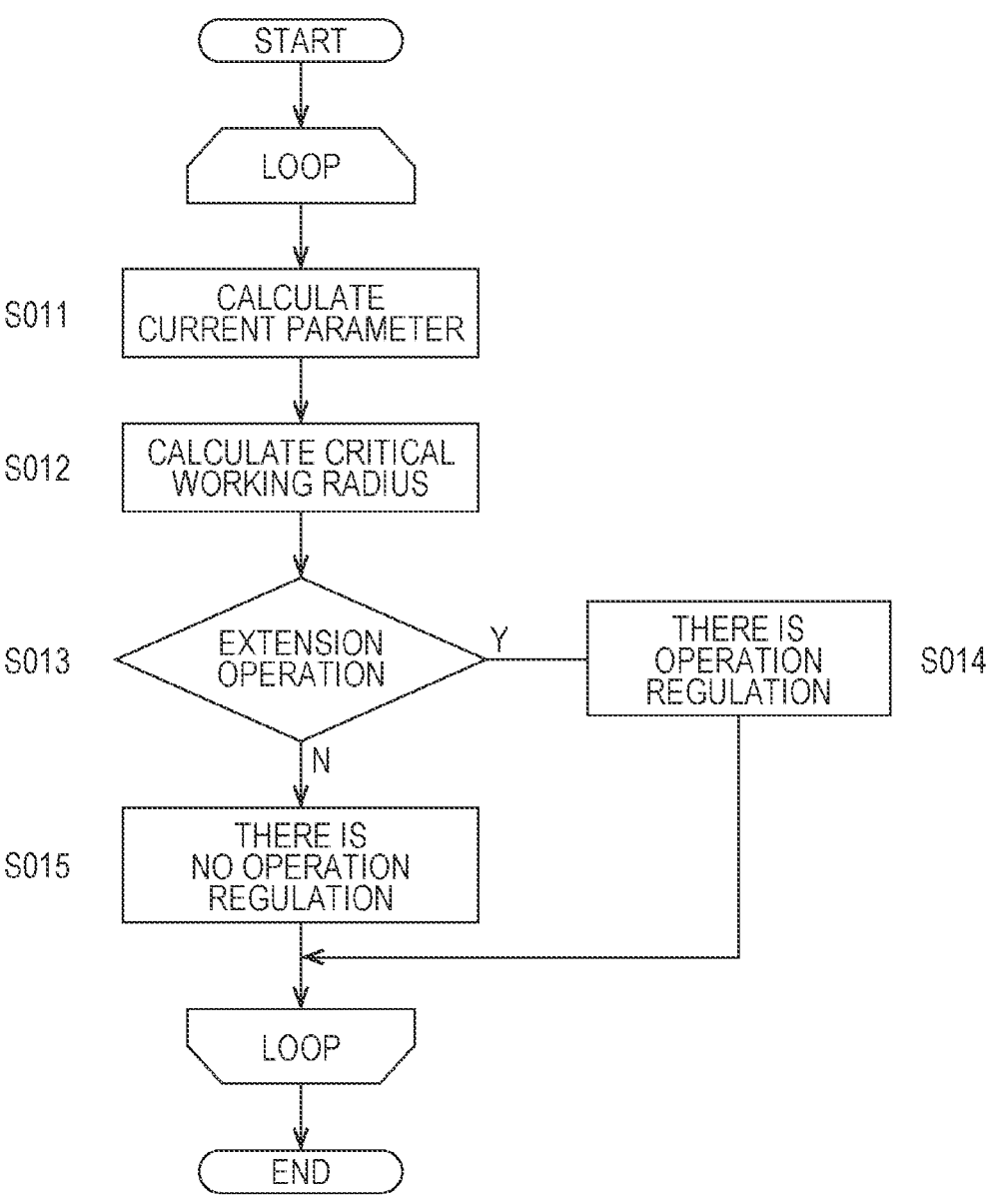
FIG. 9 is a control flowchart based on a critical working radius of the loading type truck crane according to the second embodiment of the present invention.

FIG. 9 is a flowchart of calculation of a critical working radius Radi' of the loading type truck crane C according to the second embodiment of the present invention. A difference between the loading type truck crane C according to the second embodiment and the loading type truck crane C according to the first embodiment is a method of calculating the critical working radius Radi' in S012 of the flowchart of FIG. 9 and a branching method in S013. Description of the same parts as those of the first embodiment, such as the configuration of the loading type truck crane C, will be omitted.

In S012, the control device 307 calculates a critical working radius Radi'2 for the current extension operation. In the present embodiment, assuming a case where the user of the loading type truck crane C selects the extension operation and the extension operation is performed in the future, the critical working radius Radi' 2 for the extension operation of the boom is obtained.

Assuming that BL' is a boom length at the critical working radius Radi'2 for the extension operation, the following relationship is established with respect to the critical working radius Radi'2 for the extension operation and the horizontal distance Rlbm'2 between the turning center Oc and the center of gravity of the boom 203 when the boom length is BL'.

[Mathematical Expression 27]

$$Radi'\ 2 = BL' \times \cos\theta b - BH \times \sin\theta b - L \qquad \text{Expression (27)}$$

[Mathematical Expression 28]

$$Rlbm'\ 2 = BGX' \times \cos\theta b' - BGZ \times \sin\theta b' - L \qquad \text{Expression (28)}$$

BGX': A distance from the root of the boom 203 to the center of gravity of the boom in the left-right direction on the paper surface of FIG. 6 at the critical working radius Radi'2 for the extension operation In addition, the current upper weight Uwei'2 and the current upper center of gravity Ugra'2 are expressed by the following Expressions.

[Mathematical Expression 29]

$$Uwei'\ 2 = Wtip' + Wbm' + Wecv + Wsle \qquad \text{Expression (29)}$$

[Mathematical Expression 30]

$$Ugra'\ 2 = (Wtip' \times Radi'\ 2 + \qquad\qquad \text{Expression (30)}$$
$$Wbm' \times Rlbm'\ 2 + Wecv \times Rlecv + Wsle \times Rlsle)/Uwei'\ 1$$

Wbm': A weight of the boom 203 (in consideration of a weight of hydraulic oil in the boom expansion/retraction actuator 210*a*)

Then, since the critical working radius Radi'2 for the extension operation is a radius at which it is determined that the boom length LB cannot be further extended, when the critical working radius Radi'2 for the extension operation is satisfied, the moment due to the upper weight at the current state is equal to the stability moment SMOMr at the current state, and thus, the following Expression 31 holds.

[Mathematical Expression 31]

$$Uwei' \ 2 \times (Ugra' \ 2 \times cos\beta - XLI1) = SMOMr \qquad \text{Expression (31)}$$

The boom length LB' at the critical working radius Radi'2 for the extension operation, the length satisfying the above Expressions 21, 24, 27 to 31, is calculated, and the critical working radius Radi'2 for the extension operation is calculated from this length.

Next, in S013, the control device 307 determines whether the user of the loading type truck crane C selects the extension operation. When determining that the extension operation is selected, the control device 307 advances the process to S014. When determining that the extension operation is not selected, the control device 307 advances the process to S015.

In S014, the control device 307 implements safety control on the basis of the critical working radius Radi'2. The safety control includes at least one of regulation of the extension operation of the boom 203 and notification to the user of the loading type truck crane C. Specifically, the control device 307 performs speed regulation or disables the extension operation on the extension operation of approaching the critical working radius Radi' 2. The notification to the user is performed using the alarm device 106 connected to the control device 307, or an alarm is displayed on a display 105 connected to the control device 307.

In S015, the control device 307 ends the operation flow without regulating the operation of the crane device 20.

Others

The critical working radius Radi' is not limited to the one calculated by the method described in the above embodiment. For example, the critical working radius Radi' can be set so that the right jack reaction force PF1 or the left jack reaction force PF4 is a predetermined value.

In the above description, the critical working radius Radi' is calculated with the boom 203 as a rigid body, but it is preferable to perform the calculation in consideration of the deflection of the boom 203. The distance in the vertical direction represented by BGZ is preferably calculated in consideration of the amount of hydraulic oil supplied to the boom expansion/retraction actuator 210a. In addition, the working radius at the rising limit position and the lowering limit position of the derricking operation, or the extension limit position and the retraction limit position of the expansion/retraction operation are stored in advance in the storage unit 300, and when the critical working radius Radi' is smaller than the working radius stored in the storage unit 300, the working radius stored in the storage unit 300 can be set as the critical working radius Radi'.

In the present specification, the critical working radius Radi'1 for the lowering operation is calculated in the first embodiment, and the critical working radius Radi'2 for the extension operation is calculated in the second embodiment, but it is also possible to calculate both of these critical working radii and display both on the display 105. In addition, it is also possible to calculate both the critical working radii and display any one of the critical working radii according to the operation by the user of the loading type truck crane C.

In the first embodiment and the second embodiment, the control device 307 may calculate the first critical working radius and the second critical working radius smaller than the first critical working radius independently in calculating the critical working radius Radi'. In this case, the control device 307 may perform control (notification control) of notifying the user of the crane device 20 of information on the basis of the second critical working radius, and perform control (regulation control) of regulating the operation (extension operation and/or lowering operation) of the boom of the crane device 20 on the basis of the first critical working radius. In the first embodiment and the second embodiment, when two critical working radii are obtained, these critical working radii can be obtained by using two types of safety factors N (first factor of safety N1 and second factor of safety N2) having different values. That is, the control device 307 obtains the first critical working radius on the basis of the first factor of safety N1, and calculates the second critical working radius on the basis of the second factor of safety N2. By calculating the two critical working radii Radi' in this manner, it is possible to further improve the safety and efficiency of the crane operation.

In addition, in general, the rated load of the loading type truck crane C is determined from the performance (empty stable performance) at the turning position where stability is the worst in the lateral region in a state where there is no cargo on the cargo bed 102 and the performance (crane strength performance) determined from the strength of the structure of the crane. In the present application, when the crane strength performance radius calculated from the crane strength performance of the crane device 20 is calculated and is compared with the critical working radius Radi', and the crane strength performance radius is smaller than the critical working radius Radi', the control device 307 can perform at least one of regulation of the operation of the crane device 20 by the crane strength performance radius or notification to the user of the crane device 20.

REFERENCE SIGNS LIST

C loading type truck crane
10 vehicle
20 crane device
100 frame
101 operator cab
102 cargo bed
103 front wheel
104 rear wheel
105 display
106 alarm device
107 engine
200 outrigger device
200a right jack
200b left jack
200c right overhanging actuator
200d left overhanging actuator
201 fixing portion
202 turning table
203 boom
203a proximal end boom
203b first intermediate boom
203c second intermediate boom
203d distal end boom
205 wire rope
206 hook
210a boom expansion/retraction actuator
210b winch hydraulic motor 210c boom derricking actuator
210d boom turning actuator
211a boom expansion/retraction control valve
211b winch control valve
211c boom derricking control valve
211d boom turning control valve
212a right jack control valve
212b left jack control valve
212c right overhanging control valve
212d left overhanging control valve
300 storage unit
301 suspended load information detector
302 turning angle information detector
303 length information detector
304 derricking angle information detector
305a right reaction force information detector
305b left reaction force information detector
306a right overhanging information detector
306b left overhanging information detector
307 control device
310 hydraulic circuit
311 hydraulic valve unit
312 tank
313 hydraulic pump
314 main oil passage
315 return oil passage
Radi' critical working radius

The invention claimed is:

1. A loading type truck crane comprising:
an outrigger device including a right outrigger and a left outrigger that are mounted on a vehicle and are capable of extending and retracting in a vehicle width direction of the vehicle;
a crane device that includes a turnable boom and is mounted on the vehicle; and
a control device that calculates a critical working radius of the crane device on a basis of a ground-contact reaction force of the outrigger device, and implements safety control related to at least one of a lowering operation and an extension operation of the boom by the crane device on a basis of the calculated critical working radius,
wherein the safety control includes regulation control for regulating a lowering operation and an extension operation of the crane device.

2. The loading type truck crane according to claim 1, wherein the safety control further includes notification control for notifying a user of the crane device of information.

3. The loading type truck crane according to claim 2, wherein
the critical working radius includes a first critical working radius and a second critical working radius smaller than the first critical working radius, and wherein
the control device implements the notification control on a basis of the second critical working radius, and implements the regulation control on a basis of the first critical working radius.

4. The loading type truck crane according to claim 1, wherein the control device:
calculates a crane strength performance radius from crane strength performance used to determine a rated load of the loading type truck crane;
compares the calculated crane strength performance radius with the critical working radius;
implements the safety control based on the critical working radius when the critical working radius is smaller than the crane strength performance radius; and
implements the safety control based on the crane strength performance radius when the crane strength performance radius is smaller than the critical working radius.

5. The loading type truck crane according to claim 1, further comprising:
a display that is connected to the control device and displays a state of the loading type truck crane, wherein
the control device displays the critical working radius on the display.

6. The loading type truck crane according to claim 1, wherein
the regulation control regulates the lowering operation and the extension operation of the crane device by performing speed regulation or disabling the lowering operation in response to the lowering operation approaching the critical working radius.

* * * * *